INVENTOR.
WELLS J. HORVEREID
BY
ATTORNEYS

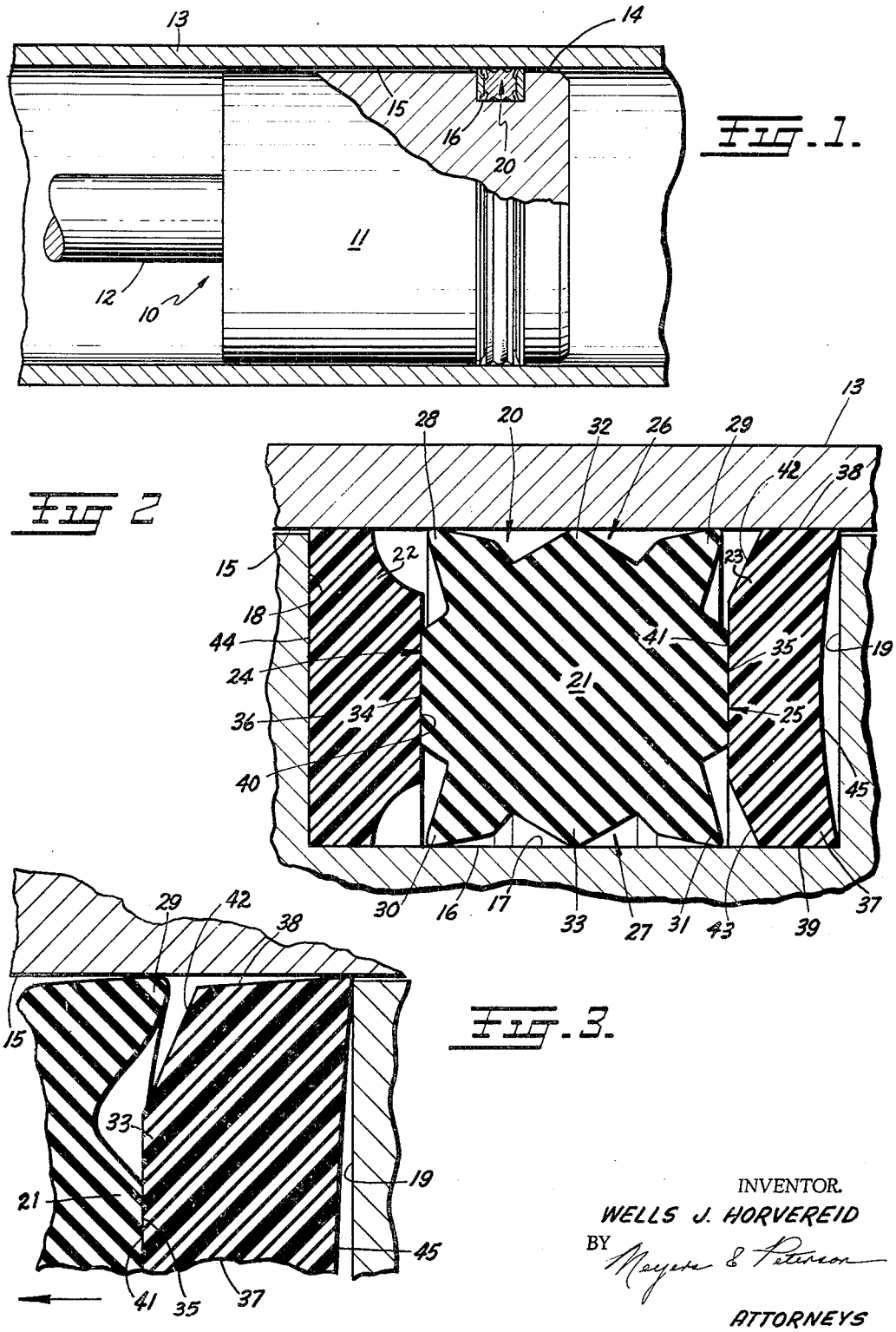

United States Patent Office 3,215,441
Patented Nov. 2, 1965

3,215,441
RESILIENT SEAL AND DISTORTION
CONTROLLING MEANS THEREFOR
Wells J. Horvereid, Minneapolis, Minn., assignor to Precision Associates, Inc., a corporation of Minnesota
Filed May 17, 1962, Ser. No. 195,454
12 Claims. (Cl. 277—176)

This invention relates to sealing ring assemblages, and more particularly to an assemblage including a ring of the type having distortable and resilient characteristics.

It is an important object of the invention to provide an assemblage which includes a non-twisting resilient sealing ring which will be highly efficient under widely varying conditions of pressure and friction when confined in contacting engagement between the confronting surfaces of two members to be sealed.

Another object of the invention is to provide an assemblage of a resilient ring in a groove system such as will maintain in the sealing ring an unusually low break-away friction for a wide range of seal-operating pressures, including low, and negative, pressures.

A further object is to provide a sealing assemblage utilizing a seal ring having desirable degrees of resilience and distortability, which, when combined with separate bumper-type elements, will be capable of easy installation without injury to the components and will present a static resistance under use which will permit the ring to seal effectively without crushing or extruding into clearances between members to be sealed.

A still further object of the invention is to provide a seal ring assemblage which includes a principal resilient ring element functioning in a groove system between two auxiliary ring members to give efficient sealing and good lubrication when its exposed face is utilized in sliding pressure contact with a surface to be sealed and its adjoining side faces, angulated with respect to the first, are utilized in static pressure contact with bumper portions formed on each of said auxiliary rings, the latter either being separate and distinct ring elements or even formed integrally at the annular sides of the grooves itself.

These and other objects and advantages of my invention will more fully appear from the following description, made in connection with the accompanying drawing, wherein like reference characters refer to the same or similar parts throughout the several views and in which:

FIGURE 1 represents a typical application of the present invention as used in connection with a conventional piston requiring a sealing ring; the piston is shown operably positioned within a cylinder, part of the piston being broken away to disclose the cross-sectional relation of the seal ring assembly and the piston;

FIGURE 2 is an enlarged segmental view in vertical section showing the seal ring assembly in more detail, the auxiliary rings being of two forms for purposes of illustration;

FIGURE 3 is a further enlarged segmental view of FIGURE 2 showing in greater detail the operable position of two of the elements in coacting relation;

Figure 4:
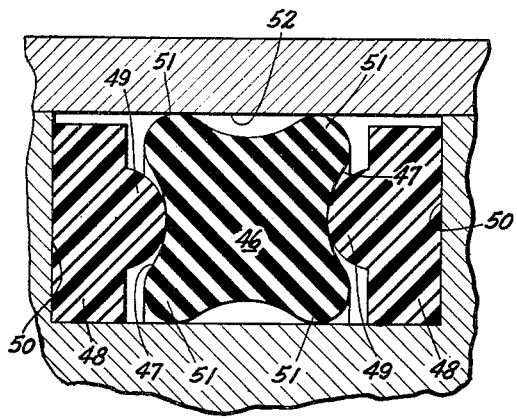
FIGURE 4 shows an alternate form of the invention assembly.

Referring again to FIGURE 1, a piston 10 having a head 11 and rod 12 is shown operably positioned in the cylinder 13. The piston head 11 has an outer piston surface 14 which lies in juxtaposition with the inner cylinder wall 15. Encircling the cylinder head 11 is a groove 16.

With particular reference now to FIGURE 2, groove 16 is defined by a base 17 and a pair of confronting side walls 18 and 19. The elements of the seal ring assembly 20 are shown positioned within the groove 16. In addition to the surfaces to be sealed and the groove, the assembly consists of an annular seal ring 21 and a pair of auxiliary rings or distortion controlling bumper members 22 and 23, the seal ring 21 being of a resilient and flexible material such as rubber and the distortion controlling members being of a rigid material or a slightly distortable material such as Teflon, leather and the like.

The seal ring 21 has static pressure sides 24 and 25, which confront respectively side walls 18 and 19 of the ring groove 16 and a sliding pressure side 26 formed on the outer peripheral circumference. Side 26 is adapted to frictionally contact the inner cylinder wall 15. The inner peripheral circumference of seal ring 21 constitutes a side 27 which is primarily of a static nature in its contact with groove base 17 but may slide to a limited degree when piston 11 changes direction. The sliding pressure side 26 is provided with a pair of corner-positioned sealing lips 28 and 29, lip 28 lying in common with a sealing lip 30 at static pressure side 24 and lip 29 lying in common with lip 31 at the static pressure side 25. In FIGURE 2, one particular form of the seal ring is shown wherein it is also provided with ribs 32 and 33 which are respectively intermediate the lips 28, 29 and 30, 31 on both the outer and inner sides 26 and 27. The functions and advantages of providing an integral seal ring of similar construction are set forth in my copending application Serial Number 840,353, filed September 16, 1959, now Patent No. 3,052,478, so that further detailed explanation thereof will be dispensed with except to briefly mention that these elements and their configurations greatly enhance the capability of the seal ring to withstand high hydrostatic forces without scrubbing or extruding.

The sides of the seal ring 21 are provided with bearing areas 34, 35 which, as shown in FIGURE 2, constitute annular areas intermediate the pairs of lips 28, 30 and 29, 31. In the above referred to application on seal ring, the bumpers were generally intended to protrude laterally from the ring and to abut the groove side walls 18 and 19. Thus when a pressure from one of the side walls 18 and 19 is applied to the adjoining bumper, a compressing effect upon the seal ring causes a convergence of the static pressure sides 24 and 25 and an outward radial bulge of the sliding pressure side 26 whereby to cause increased sealing characteristics for increasing pressures. It appears, however, that the pressure on the delicate lips 28 and 29 are not appreciably increased because of a slight change of angulation and contramovement caused by the distortion of the ring. Thus, under increased pressure, each pair of lips 28, 30 and 29, 31 tend to turn toward one another.

In the present invention, separate distortion controlling means 36 and 37 are included within the groove 16, respectively lying between the seal ring 21 and groove side walls 18 and 19. Hence, the movement of the piston and opposing fluid pressure will exert force upon one of the distortion controlling members 36 and 37, depending upon the direction of piston movement, which in turn will cause pressure against the corresponding seal ring bearing area 34.

If the distortion controlling elements 36 and 37 are constructed of slightly resilient material, these auxiliary elements can assist in sealing. Thus element 37 has a bowed construction which will permit a slight amount of flexure, which in turn causes the outer annular surface 38 to expand outwardly into contact with the cylinder wall 15 and the inner annular surface 39 to expand inwardly to more positively contact the groove base 17.

It will be noted that the distortion controlling rings 36 and 37 in FIGURE 2 have respective laterally projecting medial portions 40 and 41 for mating with the seal ring bearing areas 34 and 35. Limiting the area of the projecting portions permits the formation of a chamfered corner 42 (see particularly FIGURE 3) and 43 at both of the inner corners of distortion controlling element 37. By forming the corners in this manner, full pressure of the distortion controlling element 37 will be exerted against the ring 21 without causing undesirable interference with the seal ring lips 29 or 31.

As shown in FIGURE 2, element 36 is provided with a flat outer side 44 which is adjacent the side wall 18, thus providing continuous and positive resilient pressure against the seal ring 21 when forces are exerted in that direction. Bumper 37, however, shows an alternate configuration wherein the outer side 45 is cambered. With pressure coming from side wall 19, the cambered side 45 gradually flattens out with force applied by the seal ring 21. Because of the cambered surface 45, a portion of the shock force developed upon reversal of the piston will be absorbed by the distortion controlling ring 37.

Figure 5:
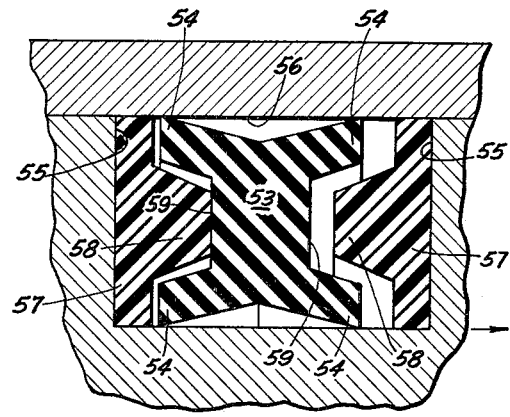
FIGURE 5 is a view similar to that of FIGURE 4 but showing a still further alternate form of the invention assembly.

Referring to FIGURES 4 and 5, alternate forms of the invention are shown. FIGURE 4 shows a seal ring 46 which has a curved recess 47 at each side in lieu of a flat bearing projection as disclosed in FIGURE 2. Accordingly, the distortion controlling elements 48 are each provided with a medial lobe 49 which interfits with and transfers the forces of groove side walls 50 to the medial area of the associated recess 47. In this intsance, the seal ring 46 is provided with rounded corner lips 51 which, in cooperation with the recesses 47 and medial lobes 49, prevent undue distortion thereof even under very high hydrostatic pressures. Since the rate of curvature of the lobes 49 is greater than that of the recesses 47, no wedging effect with cylinder wall surface 52 can occur and here, as before, the pairs of lips 51 at each side of the sealing ring can tend to converge to offset the general outward expansion of the ring under pressure.

FIGURE 5 discloses a seal ring 53 which, on the trailing or low pressure side of the sealing assemblage during a stroke of the piston, would allow objectionable distortion of the sealing corners 54 if used alone in a groove with sides 55 slidably cooperating with a cylinder wall 56. However, with the distortion controlling members 57 as shown, which have a pronounced medial portion 58 acting in cooperation with the recessed bearing areas 59 of seal ring 53, pressures will be transferred from the groove side walls 55 in such a manner as to eliminate lip extrusion. FIGURE 5 also illustrates how the sealing ring need not be installed in constant contact with the distortion controlling members but may even lie in clearance therewith when in relaxed condition. In the view of FIGURE 5, the sealing ring 53 is shown at the beginning of a pressure stroke wherein the ring assembly is moving in the direction of the arrow with respect to cylinder surface 56.

Figure 6:
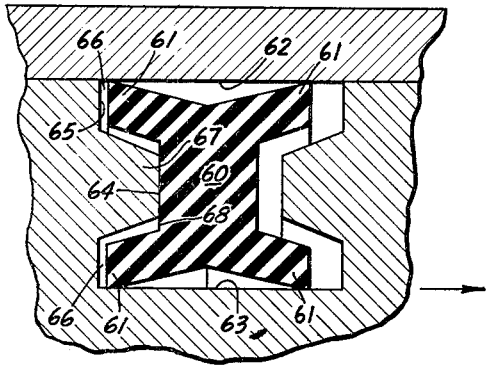
FIGURE 6 is a further alternate form of the invention wherein the bumper element is integrally formed with the groove.

With reference to FIGURE 6, a seal ring assemblage is disclosed wherein the resilient sealing ring 60 is similar to the sealing ring 53 illustrated in FIGURE 5. The sealing ring 60 has protruding lips 61 which are adapted normally to lie in contact with sliding surface 62 and with the groove bottom 63 as shown. The sealing ring 60 is also provided with a recessed inner wall 64 formed between the protruding lips 61. Groove side walls 65 are so cut as to provide a clearance 66 between the lips 61 and side wall 65, even when pressure is exerted by the groove system in the direction of the arrow with respect to slide surface 62. The means for maintaining the clearance and for controlling the distortion of sealing ring 60 resides in the annular lobe or protrusion 67 which may be formed integrally with the piston at the time the groove system is cut in the circumference thereof. The protrusion 67 has a pronounced bearing surface 68 which presses against the recessed area 64, the clearances between the sealing ring 60 and the groove sides permitting the same distortion control previously described in connection with other forms of the invention.

Figure 7:
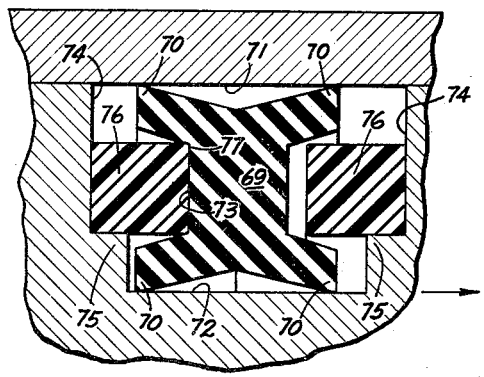
FIGURE 7 is a still further alternate form in which the groove is formed with an annular shoulder and the auxiliary bumper element constitutes a rectangular cross-sectional element.

FIGURE 7 is still a further form of the invention wherein the distortion controlling element constitutes a simple annular ring member held in position by a particular conformation of the groove system. In FIGURE 7, the sealing ring is designated as 69 which in turn may be of a similar configuration to that previously disclosed wherein the sealing ring has lobes or lips 70 in contact with a sliding surface 71 and a groove bottom 72 as shown. The sealing ring 69 also has a bearing area 73 independent of the lips 70 which may be recessed as heretofore described. Sealing ring 69 lies in the groove defined by the side surfaces 74 and bottom 72. Each of the sides 74 is provided with an inwardly formed shoulder portion 75 which permits a distortion controlling ring 76 to be inserted at each side of the groove and to be spaced both from the cylinder wall 71 and from the groove bottom 72. Distortion controlling ring 76 has an inwardly projecting bearing surface 77 which is adapted to press against the recessed area 73 at each side of sealing ring 69 as pressure is alternately brought to bear upon the sides of sealing ring 69.

It will be noted that in all the forms of the invention as disclosed herein the sealing ring assemblage comprises three elements, namely, a distortable and resilient sealing ring having corner projecting sealing lips which can flex independently of the main body portion of the sealing ring, and a pair of distortion controlling elements disposed one at each side of the sealing ring 69 and adapted to bear against a substantial portion of the sealing ring while maintaining clearance both between the sides of the groove and the non-bearing portions of the distortion controlling element with respect to the sealing lips themselves. The net result is to permit a consistent high quality sealing effect of the delicate lip portions through a large range of pressures by preventing scrubbing or pinching of the lips while at the same time absorbing and controlling most of the distortion effects within the body of the sealing ring.

It will, of course, be understood that various changes may be made in the form, details, arrangements and proportions of the parts without departing from the scope of my invention as set forth in the appended claims.

What is claimed is:

1. A sealing ring assembly comprising a first member having a surface to be sealed, a second member having a surface confronting that of said first member and adapted to be sealably engaged therewith, an annular groove formed in the surface of one of said members, a resiliently distortable seal ring having an annular body which, in cross-section, includes a pair of outwardly opposed static pressure sides and a sliding pressure side extending from one of the static pressure sides to the other, said sliding pressure side lying in contact with the surface of said first member, the cross-section of said sealing ring defining four outwardly projecting and divergently angulated corner-positioned sealing lips, each of said static pressure sides having a pair of said corner-positioned sealing lips in common therewith and a substantial bearing area lying in laterally spaced relation with respect to one of said pairs of sealing lips, and an annular distortion controlling member extending inwardly of a side of said annular groove and at a position between the top and bottom thereof and adapted to engage only said bearing area adjacent thereto when fluid pressure is applied to the opposite side of said seal ring, said bearing area thereby absorbing the greater amount of compressive force and permitting the lips to function freely under pressure without folding or crushing by reason of the lack of engagement of said distortion controlling member with said lips.

2. The sealing ring assembly of claim 1 wherein the cross-section of said seal ring defines a side-for-side symmetrical configuration.

3. The sealing ring assembly of claim 1 wherein said annular distortion controlling member is integrally formed with that side wall of said annular groove nearer said bearing area.

4. The sealing ring assembly of claim 1 wherein said annular distortion controlling member comprises an auxiliary ring installed in said groove.

5. A sealing ring assembly comprising a first member having a surface to be sealed, a second member having a surface confronting that of said first member and adapted to be sealably engaged therewith, an annular groove formed in the surface of one of said members, a resiliently distortable seal ring having an annular body which, in cross-section, includes a pair of outwardly opposed static pressure sides and a sliding pressure side extending from one of the static pressure sides to the other, said sliding pressure side lying in contact with the surface of said first member, said cross-sectional configuration of said seal ring being substantially rectangular and defining four outwardly projecting and divergently angulated corner-positioned sealing lips, each of said static pressure sides having a pair of said corner-positioned sealing lips in common therewith and one of said pair of sealing lips in each instance being adapted to flexibly engage the surface of said first member in sliding sealed engagement and a bearing area lying in laterally spaced relation with respect to each of said one sealing lips, and an annular controlling member extending inwardly of a side of said annular groove at a position between the top and bottom thereof and adapted to engage only said bearing area adjacent thereto when fluid pressure is applied to the opposite side of said seal ring, said last-mentioned bearing area thereby absorbing the greater amount of compressive force and permitting the pair of lips in common therewith to function freely under pressure without folding or crushing by reason of the lack of engagement of said distortion controlling member with said last-mentioned pair of lips.

6. The sealing ring assembly of claim 5 wherein each bearing area lies in laterally spaced relation between the pair of lips in common therewith at each static side of said seal ring.

7. The sealing ring assembly of claim 5 wherein the bearing area is recessed into the body of said seal ring at each static side thereof.

8. The sealing ring assembly of claim 5 wherein the cross-sectional configuration of the recessed bearing area is concavely curved, and the associated annular distortion controlling member is convexly curved at a relatively greater radius of curvature.

9. A sealing ring assembly comprising a first member having a surface to be sealed, a second member having a surface confronting that of said first member and adapted to be sealably engaged therewith, a groove formed in the surface of one of said members, a resiliently distortable sealing member in said groove having a cross-section forming a pair of projecting flexible lips and a centrally disposed bearing area therebetween in a spaced relationship with said lips, said bearing area being appreciably greater than the cross-sectional thickness of either lip, and a distortion controlling member having a bearing area approximating in size said first-mentioned bearing area so as to abut against said first-mentioned area, said second-mentioned area projecting from the body of said distortion controlling member toward said sealing member a greater distance than said lips project toward said distortion controlling member so that no portion of said controlling member can engage said lips, and a second pair of lips on said sealing member projecting in an opposite direction from the side of said sealing member remote from said first pair of lips, whereby said first-mentioned lips are free to flex without having any compressive forces applied directly thereagainst by said controlling member when fluid pressure is applied to said remote side of said seal ring.

10. The sealing ring assembly of claim 9 in which the corners of said distortion controlling member are chamfered to prevent engagement of said controlling member with said lips.

11. A sealing ring assembly comprising a first member having a surface to be sealed, a second member having a surface confronting that of said first member and adapted to be sealably engaged therewith, a groove formed in the surface of one of said members, a resiliently distortable sealing member in said groove having a cross-section forming a pair of projecting flexible lips and a centrally disposed bearing area therebetween in a spaced relationship with said lips, said bearing area being appreciably greater than the cross-sectional thickness of either lip, and a distortion controlling member having a bearing area approximating in size said first-mentioned bearing area so as to abut against said first-mentioned area, said second-mentioned area projecting from the body of said distortion controlling member toward said sealing member a greater distance than said lips project toward said distortion controlling member so that no portion of said controlling member can engage said lips, whereby said lips at all times are free to flex without having any compressive forces applied directly thereagainst by said controlling member, said sealing member being provided with a second pair of lips projecting in an opposite direction from said first pair of lips and having a second centrally disposed bearing area therebetween in a spaced relationship with said lips, and a second distortion controlling member having a projecting bearing area for abutting the second bearing area of said sealing member in a manner similar to that in which the bearing area of said first controlling member abuts said first bearing area of said sealing member.

12. The sealing ring assembly of claim 11 in which one of said distortion controlling members has a cambered side remote from said sealing member.

References Cited by the Examiner

UNITED STATES PATENTS

| 2,841,429 | 7/58 | McCuistion | 277—188 X |
| 2,882,104 | 4/59 | Guthans | 277—102 X |
| 2,934,363 | 4/60 | Knox | 277—160 |
| 3,052,478 | 9/62 | Horvereid | 277—209 |

FOREIGN PATENTS

| 1,221,847 | 1/60 | France. |
| 826,521 | 1/60 | Great Britain. |
| 843,562 | 8/60 | Great Britain. |

LEWIS J. LENNY, *Primary Examiner.*

SAMUEL ROTHBERG, EDWARD V. BENHAM,
*Examiners.*